(12) United States Patent
Li

(10) Patent No.: US 12,643,485 B2
(45) Date of Patent: Jun. 2, 2026

(54) WHEEL HOLDER, EXTENSION MODULE AND REAR LOAD CARRIER

(71) Applicant: Carman Enterprise Co., Ltd., Hangzhou (CN)

(72) Inventor: Xianwei Li, Hangzhou (CN)

(73) Assignee: Carman Enterprise Co., Ltd. (CN)

( * ) Notice: Subject to any disclaimer, the term of this patent is extended or adjusted under 35 U.S.C. 154(b) by 323 days.

(21) Appl. No.: 18/304,562

(22) Filed: Apr. 21, 2023

(65) Prior Publication Data

US 2023/0398947 A1 Dec. 14, 2023

(30) Foreign Application Priority Data

Jun. 10, 2022 (CN) .......................... 202210653915.7

(51) Int. Cl.
B60R 9/10 (2006.01)
B60R 9/06 (2006.01)

(52) U.S. Cl.
CPC . B60R 9/10 (2013.01); B60R 9/06 (2013.01)

(58) Field of Classification Search
CPC .................................... B60R 9/10; B60R 9/06
See application file for complete search history.

(56) References Cited

U.S. PATENT DOCUMENTS

| | | | |
|---|---|---|---|
| 2,019,636 A | 11/1935 | Scrantom | |
| 4,823,997 A | 4/1989 | Krieger | |
| 5,038,983 A | 8/1991 | Tomososki | |
| 5,586,702 A | 12/1996 | Sadler | |
| 5,690,259 A | 11/1997 | Montani | |
| 5,862,966 A | 1/1999 | Mehls | |
| 5,947,357 A | 9/1999 | Surkin | |
| 6,047,869 A | 4/2000 | Chiu | |
| 6,089,394 A | 7/2000 | Ziglar | |
| 6,152,341 A | 11/2000 | Lemay | |
| 6,168,058 B1 | 1/2001 | Janek | |
| 6,244,483 B1 * | 6/2001 | McLemore | B60R 9/06 224/521 |

(Continued)

FOREIGN PATENT DOCUMENTS

| | | |
|---|---|---|
| CN | 118871323 A | 10/2024 |
| DE | 29916746 U | 1/2000 |

(Continued)

OTHER PUBLICATIONS

International Search Report for European Application No. 2185257. 7-1009 dated May 24, 2023, 8 pages.

(Continued)

*Primary Examiner* — Brian D Nash
(74) *Attorney, Agent, or Firm* — Thorpe North & Western, LLP

(57) ABSTRACT

The present invention relates to a wheel holder, which is designed such that it can be pushed on an end section of a profile rail (13) of a rear load carrier (1). Also the invention relates to an extension module (34) for carrying a load having attachment means for releasable attachment to a rear load carrier (1) comprising at least one profile rail (13), wherein the extension module (34) comprises one extension profile rail (35) and two wheel holders (12) which are preferably pushed on the free ends of the extension profile rail (35).

3 Claims, 12 Drawing Sheets

(56) References Cited

U.S. PATENT DOCUMENTS

Figure 1:
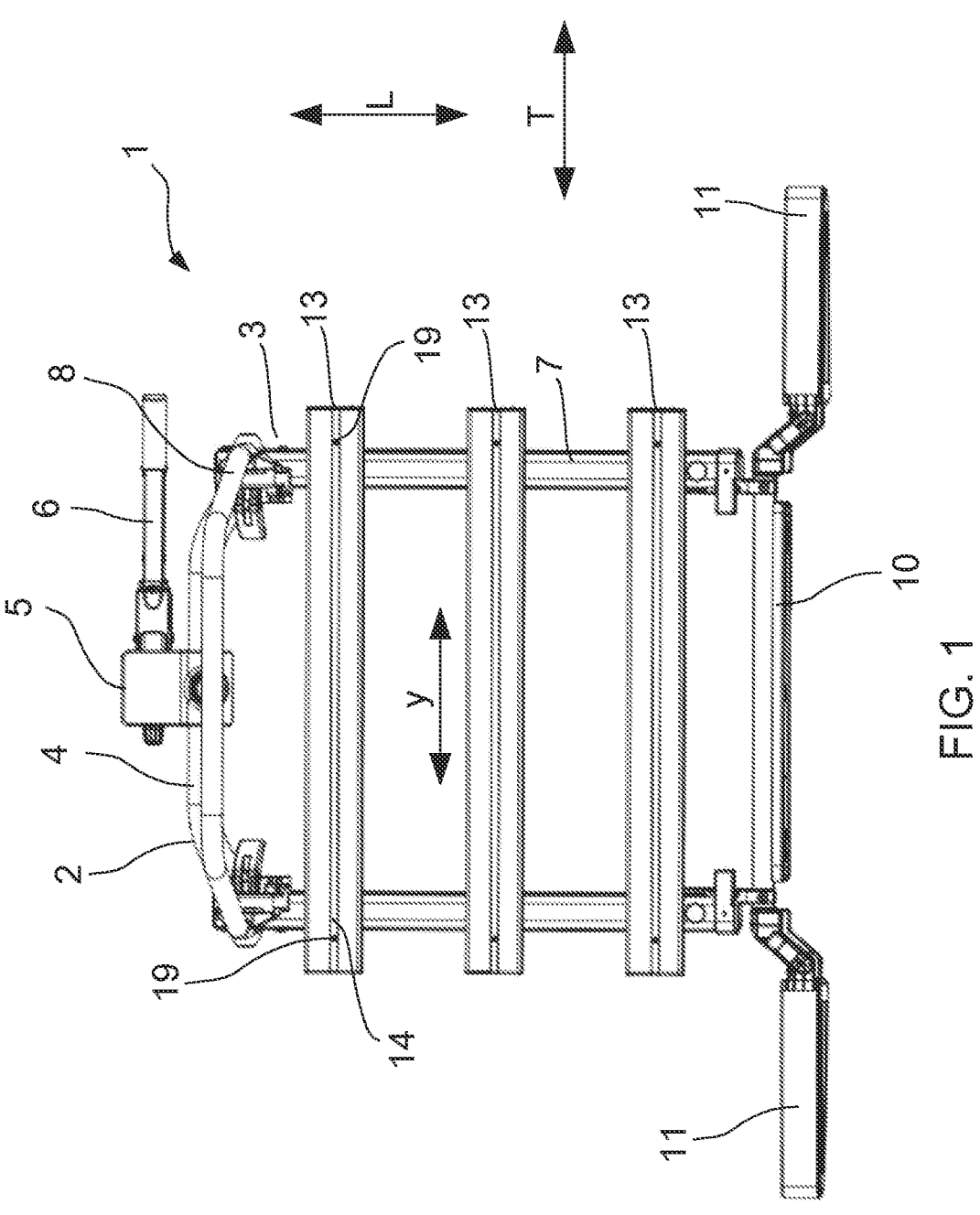

| | | | | |
|---|---|---|---|---|
| 6,491,195 B1 * | 12/2002 | McLemore | ............... | B60R 9/10 |
| | | | | 224/521 |
| 6,539,895 B2 | 4/2003 | Hoagland | | |
| 6,866,009 B2 | 3/2005 | Smith, Jr. | | |
| 7,789,044 B2 | 9/2010 | McGrade | | |
| 8,047,391 B2 | 11/2011 | Lu | | |
| 8,496,148 B2 * | 7/2013 | Farney | ...................... | B60R 9/06 |
| | | | | 224/533 |
| 8,763,870 B2 | 7/2014 | Davis | | |
| 9,096,182 B1 | 8/2015 | Roth et al. | | |
| 10,010,048 B2 | 7/2018 | Kellogg | | |
| 10,059,276 B2 | 8/2018 | Phillips | | |
| 10,183,627 B1 * | 1/2019 | Liu | ........................... | B60R 9/06 |
| 10,576,903 B2 | 3/2020 | Rodriguez | | |
| 10,967,805 B2 * | 4/2021 | Wang | ........................ | B60R 9/10 |
| 11,046,379 B2 * | 6/2021 | Tsai | ........................... | B62H 3/00 |
| 11,148,607 B1 * | 10/2021 | Hsieh | ...................... | B60R 9/045 |
| 11,240,991 B2 | 2/2022 | Zhuo | | |
| 12,187,236 B2 * | 1/2025 | Huo | ........................ | B60R 9/10 |
| 2003/0132259 A1 * | 7/2003 | McLemore | ............... | B60R 9/10 |
| | | | | 224/924 |
| 2003/0222112 A1 * | 12/2003 | McLemore | ............... | B60R 9/06 |
| | | | | 224/521 |
| 2008/0006664 A1 | 1/2008 | Bergerhoff | | |
| 2008/0142559 A1 | 6/2008 | Lim et al. | | |
| 2009/0058103 A1 | 3/2009 | Whitney | | |
| 2009/0229093 A1 | 9/2009 | Zwanenburg | | |
| 2011/0108592 A1 * | 5/2011 | Lee | ........................... | B60R 9/06 |
| | | | | 224/488 |
| 2011/0132946 A1 | 6/2011 | Sautter | | |
| 2013/0062383 A1 * | 3/2013 | Jeli | ........................... | B60R 9/10 |
| | | | | 224/549 |
| 2014/0158729 A1 * | 6/2014 | Pedrini | ..................... | B60R 9/06 |
| | | | | 224/501 |
| 2015/0021371 A1 | 1/2015 | Ward | | |
| 2015/0321620 A1 | 11/2015 | Lungershausen | | |
| 2016/0068111 A1 | 3/2016 | Walker et al. | | |
| 2017/0349111 A1 * | 12/2017 | Ramsdell | .................. | B60R 9/06 |
| 2018/0072237 A1 * | 3/2018 | Kuschmeader | .......... | B60R 9/10 |
| 2019/0381947 A1 | 12/2019 | Fehr | | |
| 2021/0170955 A1 * | 6/2021 | Nusbaum | .................. | B60R 9/06 |

| | | | | |
|---|---|---|---|---|
| 2022/0144181 A1 | 5/2022 | Garai | | |
| 2022/0153205 A1 * | 5/2022 | Kuschmeader | .......... | B60R 9/06 |
| 2022/0176886 A1 * | 6/2022 | Sailer | ........................ | B60R 9/10 |
| 2023/0398944 A1 | 12/2023 | Li | | |
| 2023/0398946 A1 * | 12/2023 | Li | ............................ | B60R 9/10 |
| 2023/0398947 A1 | 12/2023 | Li | | |
| 2023/0398948 A1 | 12/2023 | Li | | |
| 2024/0253575 A1 | 8/2024 | Nilvius | | |
| 2024/0351529 A1 | 10/2024 | Li | | |
| 2024/0399972 A1 | 12/2024 | Willems | | |

FOREIGN PATENT DOCUMENTS

| | | | |
|---|---|---|---|
| DE | 102 57 903 A1 | 6/2004 | |
| DE | 20 2010 016 281 U1 | 2/2011 | |
| DE | 10 2010 012 744 A1 | 9/2011 | |
| EP | 1502818 A1 | 2/2005 | |
| EP | 1 837 240 A1 | 9/2007 | |
| EP | 2 338 739 A1 | 6/2011 | |
| EP | 3 581 436 A1 | 12/2019 | |
| FR | 2 769 880 A1 | 4/1999 | |
| FR | 2905644 A | 3/2008 | |
| JP | 2010042805 A | 2/2010 | |
| JP | 2017-081320 A | 5/2017 | |
| KR | 101 474 661 B1 | 12/2014 | |
| KR | 20240169346 A | 12/2024 | |
| SE | 535620 C2 | 10/2012 | |
| SE | 536070 C2 | 4/2013 | |
| WO | WO 2013/022671 A1 | 2/2013 | |
| WO | WO 2022/064290 A1 | 3/2022 | |

OTHER PUBLICATIONS

International Search Report for European Application No. 22185,249. 4-1009 dated May 24, 2023, 7 pages.
European Search Report dated Oct. 2, 2022, for application No. 22184972.2 -1009, 7 pages.
International Search Report dated Jan. 16, 2023, for application EP 22184361.8, 6 pages.
European Search Report dated Sep. 3, 2021, for Application No. 21176694.4, 6 pages.

* cited by examiner

WHEEL HOLDER, EXTENSION MODULE AND REAR LOAD CARRIER

The present invention relates to a wheel holder for releasable attachment to a rear load carrier. Furthermore, the invention relates to an extension module for carrying a load, in particular an additional bicycle for releasable attachment to a rear load carrier. In addition, the invention relates to a rear load carrier for mounting to a vehicle.

Load carriers for fastening to the rear end of vehicle, in particular a motor vehicle such as a car, are often used for transporting bicycles. Generally, this type of load carrier comprises a connecting device at its front end region which is normally designed so that the load carrier can be fastened to the ball of a conventional trailer coupling. Normally, a plurality of wheel holders is provided such that they can receive the wheels of bicycles in order to fix them at the rear load carrier.

Such rear load carriers have proven itself in principal. However, it is sometimes considered as disadvantageous, that it is difficult to adapt the load carriers to bicycles having different sizes.

Therefore, it is an object of the present invention to create an alternative wheel holder and an alternative rear load carrier as well as an extension module for a rear load carrier that can be easily adapted to the size of different bicycles and in particular avoids the above mentioned disadvantages.

This object is solved by a wheel holder for releasable attachment to a rear load carrier for mounting to a vehicle comprising at least one profile rail, wherein the wheel holder is designed such that it can be pushed on an end section of a profile rail of a rear load carrier.

Furthermore, the object is solved by a rear load carrier for mounting to a vehicle, with a base body, which defines a longitudinal direction between its front side and its rear side and a transverse direction, a connecting device for attachment to a vehicle side trailer coupling provided at the front side of the base body, and fixing means, which comprise at least two, in particular exactly three profile rails which are held on the base body and extend in the transverse direction, wherein, on at least one, in particular on both ends of at least one profile rail, preferably on both ends of each profile rail, a wheel holder according to the invention is pushed on.

The invention is based on the consideration to provide a wheel holder which can be flexibly pushed on an end section of profile rail provided at a rear load carrier. In this way, two wheel holders can be pushed on a profile rail on opposite end sections, so that the two wheels of a bicycle can be fixed on the rear load carrier. The wheel holders can be pushed so far on the profile rails depending on the distance between the wheels of a bicycle. An easy adaption to the size of the bicycle is thus possible.

According to a preferred embodiment, the wheel holder comprises a wheel holder body defining a lengthwise direction, which wheel holder body has a receiving opening open to a proximal end that has a cross section complementary to the cross-section of a profile rail of a rear load carrier so that the wheel holder body can be pushed with its proximal end on the profile rail and can surround the profile rail of the rear load carrier at least partially such that the wheel holder can be fixed in a form-fit manner perpendicularly to the lengthwise direction. In other words, the wheel holder extending between a proximal and a distal end can have a receiving opening, the inner contour of which is chosen correspondingly to the outer contour of a profile rail of a rear load carrier such that the wheel holder body can be pushed on the profile rails. It is not necessary, that the wheel holder body surrounds the profile rail completely. Moreover, it is sufficient, if the wheel holder body surrounds the profile rail partially, such that the wheel holder body is held on the profile rail perpendicularly to its lengthwise direction in a form-fit manner, but can be moved relative to the profile rail in its lengthwise direction.

The receiving opening may extend through a proximal section of the wheel holder body into the latter and may be open distally. Accordingly, it may be provided that the engagement of the profile rail and the wheel holder body is limited to a proximal section of the wheel holder body. Accordingly, if the wheel holder body is pushed sufficiently on the profile rail, the profile rail of rear load carrier may project distally out of the proximal section as the receiving opening may be formed as a through-opening open distally.

Furthermore it may be provided that the receiving opening is open towards a bottom side of the wheel holder body. Accordingly, it is not necessary that the wheel holder body surrounds the profile rail completely. Moreover, it is sufficient, if a form-fit engagement is realized in order to securely hold the wheel holder body on the profile rail.

The receiving opening of the wheel holder body may be limited upwards by a convexly shaped wall, which is designed to be brought in engagement with a corresponding concave upper contour of a profile rail of a rear load carrier. In this way, a contact over a large surface between the wheel holder body and a profile rail can be achieved. Correspondingly, the profile rails of the rear load carrier may have a concave outer contour towards their upper side.

Furthermore, engagement projections may be formed at both lateral sides of the receiving opening, which engagement projections engage inwards and upwards so that they can be brought into engagement into corresponding engagement grooves formed in the profile rail of a rear load carrier open downwardly. In other words, the wheel holder body may lay from the top on a profile rail of a rear load carrier and can be secured by engagement projections formed at the lateral sides, which engage inwards and upwards, into a corresponding engagement groove of the profile rail. In this way, a safe fixation of the wheel holder body at the profile rail perpendicularly to the lengthwise direction of the profile rail can be achieved. The profile rails of the rear load carrier may accordingly comprise on their both lateral sides an engagement groove, in particular having a V-shaped cross-section open towards the bottom, so that corresponding engagement projections of a wheelholder of a load receiving device can engage behind the profile rails into the engagement groove.

Furthermore, the wheel holder body may comprise an abutment protrusion facing downwardly such that the wheel holder body can be pushed on a profile rail until the end of the profile rail comes into contact with the abutment protrusion. In this way, the movement of the wheel holder body relative to the profile rail is limited. The abutment protrusion is preferably formed at the distal end of the wheel holder body.

In order to accommodate the wheel of a bicycle, the wheel holder body may comprise an end section, in which an upwardly open wheel receiving deepening extending in the lengthwise direction for receiving the wheel of bicycle is formed. Furthermore, in a manner known per se, the wheel holder may comprise fastening means in order to fix a wheel of a bicycle. These fastening means may comprise a belt which is or can be attached to the wheel holder body and can be laid around the wheel of a bicycle in order to fix the wheel of a bicycle. Accordingly, the two wheel holders assigned to the profile rail can be positioned relative to each other at a distance such that the wheels of a bicycle fit in the wheel receiving deepenings.

In addition, locking means may be provided by means of which the wheel holder body can be locked relative to the profile rail, in particular in a force-fit manner. In concrete terms, the locking means may comprise a slot nut, which is or can be positioned in a T-groove formed in the profile rail, and a corresponding clamping screw, which is screwed into the slot nut and engages through a through-hole formed in the wheel holder body, so that the wheel holder body can be braced against the corresponding profile rail. In other words, the slot nut can be brought into engagement with a bottom section of a T-shaped groove formed in the profile rail so that—by means of the clamping screw—the wheel holder body can be braced against the profile rail.

The rear load carrier according to the invention may be characterized in that each profile rail comprises a groove having a T-shaped cross-section extending in the lengthwise direction of the profile rail, which groove is open towards the upper side. Such a T-shaped groove has a bottom groove section which has a larger groove width than an upper groove section so that the bottom groove section undercuts the upper groove section. Accordingly, a slot nut adapted to the width of the bottom groove section can be inserted and can engage behind the upper groove section, in order to fix a load receiving device in a force-fit manner. Preferably, the groove is arranged centrally in the profile rail. In this way, a symmetrical load can be achieved.

According to an alternative embodiment of the locking means, the slot nut may comprise a threaded pin extending upwards, which threaded pin is fixedly attached to the slot nut and extends through a through-hole formed in the wheel holder body so that the free end of the threaded pin protrudes upwards from the wheel holder body, and a clamping nut is provided which can be screwed on the free end of the threaded pin, so that the profile rail and the wheel holder body can be braced to each other between the slot nut and the clamping nut. The arrangement may be such that the clamping nut is in direct contact with the wheel holder body and the slot nut is in direct contact with the profile rail, in particular with a surface limiting the bottom groove section of the T-shaped groove upwardly when bracing the wheel holder body to the profile rail. The clamping nut may be provided with recesses in its outer contour so that it can be actuated by hand.

Furthermore, safety means may be provided in order to avoid an unintentional separation of the wheel holder from the corresponding profile rail. Such safety means may interact with safety holes formed in the profile rail. Preferably, the safety means comprise a safety pin, which is moveably held in the wheel holder body between an upper position, in which the safety pin can be out of contact with a corresponding profile rail, and a lower position, in which the safety pin can engage into a safety hole formed in the profile rail, in particular formed in the ground of the T-shaped groove of the profile rail. Correspondingly, safety holes may be provided in the lengthwise end sections of the profile rails, which safety holes extend from the top into the profile rail, in particular from the ground of the T-shaped groove, so that corresponding safety means, for example a safety pin, of a wheel holder to be attached can engage the safety hole in order to lock the wheel holder. Accordingly, in case that the locking means loosen unintentionally and, for example due to vibrations while driving on a street, the wheel holder bodies can move relative to the profile rails, the safety means can avoid a complete detachment. When the safety pin reaches the position of a corresponding safety hole formed in the profile rail, the safety pin can come into engagement in order to lock the wheel holder body so that no further movement relative to the profile rail is possible. If two wheel holders are attached to a profile rail and each of the wheel holder bodies carries a wheel of a bicycle, it is sufficient, that the safety means of one wheel holder come into engagement with the safety hole as the other wheel holder is fixedly connected to the wheel holder via the bicycle carried.

In order to ensure an automatic engagement of the safety pin into the safety hole, the safety pin may be biased towards the lower position, in particular by means of a corresponding spring. In order to bring the safety pin intentionally out of engagement of the corresponding safety hole, a manual lever may be fixed to the safety pin in order to move the safety pin in order to move the safety pin by hand. According to a preferred embodiment, it may be provided, that the safety pin is held movably in a corresponding hole formed in the wheel holder body so that the safety pin is protected against external influences and only a manual lever extends through a corresponding lever opening towards the exterior. An upper and a lower end of the lever opening may be designed such that they limit the movement range of the safety pin.

In a further elaboration of the rear load carrier, the profile rails can be held slidingly on the base body between a retracted front position and an extended rear position. In concrete terms, the profile rails may be fixed to two sliding profiles extending in the longitudinal direction, which sliding profiles are in engagement with corresponding base profiles of the base body and are slidingly movable with the respect to the base profiles in the longitudinal direction. This design is based on the consideration to facilitate the access to the rear luggage compartment of a car when the rear load carrier is mounted thereto. Accordingly, the goods attached to the rear load carrier can be moved backwards into an extended rear position so that the rear load carrier, the goods, for example bicycles, come out of the movement range of the luggage compartment lid. Arresting means may be provided in order to lock the sliding profiles in the retracted front position. Such arresting means may comprise an arresting pin, which is held at the sliding profile and can be brought into engagement in a corresponding arresting hole formed in the corresponding base profile, when the profile rails are in their retracted front position. In particular, one arresting pin is assigned to each sliding profile.

Preferably, the profile rails are formed as hollow profiles. In this way, the rear load carrier is not very heavy, whereas a high stability of the hollow profiles can be achieved by means of support struts formed inside the profiles. According to a preferred embodiment, the fixing means may comprise exactly three profile rails, which are spaced apart from an adjacent profile rail at a same distance. Furthermore, it may be provided, that the profile rails each have the same length. Preferably, the profile rails have the same cross-section over their entire length.

Furthermore, the object of the invention is solved by an extension module for carrying a load, in particular an additional bicycle, having attachment means for releasable attachment to a rear load carrier for mounting to a vehicle comprising at least one profile rail, wherein the extension module comprises one extension profile rail and two wheel holders as described above, which wheel holders are preferably pushed on the free ends of the extension profile rail.

The idea is based on the consideration, that, if, for example, a rear load carrier comprises exactly three profile rails, each of which can be equipped with two wheel holders, a total of three bicycles can be transported. Sometimes it is considered as disadvantageous, that such a load carrier is limited regarding the number of bicycle to be transported. Accordingly, such an extension module allows to transport at least one further bicycle. Furthermore, it may be provided, that different loads can be transported. For example, a luggage box could be attached to the rear load carrier, and, in addition, by means of such an extension module, a bicycle can be transported.

The extension profile rail may be designed like the profile rails of the rear load carrier described above. Accordingly, the same wheel holders can be pushed on the free end of the extension profile rail and can be fixed thereto, as described above.

The extension module may comprise at least one, in particular two support elements, wherein one end of each support element is connected to the extension profile rail and the other end comprises attachment means in order to attach the extension module releasably to a rear load carrier, in particular to a rear profile rail of a rear load carrier. The support elements may be formed as bent profiles, in particular rectangular profiles, which may be made of aluminium or steel and may extend perpendicularly to the lengthwise direction of the extension profile rail. The distance between the support element may be chosen such that the can be attached between two wheel holders pushed on the rear profile rail of a rear load carrier. Preferably, the support elements are formed such that the extension profile rail is arranged behind the rear profile rail of the rear load carrier, in particular above the rear light units and/or a license plate holder arranged between the rear light units, when the extension module is attached to a rear load carrier.

In the free end section of each support element, one through-opening may be provided and a clamping device may be assigned to each support element, so that the free end section of the support element can be releasably braced against the profile rail of a rear load carrier. Accordingly, a clamping device may be used to brace the support element against the profile rail of rear load carrier, thus fixing the extension module releasably to the rear load carrier.

Accordingly, when attached to the rear load carrier, the extension profile rail is arranged behind the rear profile rail of the rear load carrier. A holding surface may be provided on the top of the support element in the region, where the contact surface of the clamping device comes into contact.

The clamping device for bracing the extension module to a rear load carrier may comprise a clamping lever, a pivot joint, which is rotatably held at an end section of the clamping lever about a rotation axis, an elongated clamping pin, which is fixed to the pivot joint and extends perpendicularly to the rotation axis of the pivot joint, and a slot nut fixed to the free end of the clamping pin in a rotationally fixed manner, wherein the slot nut has a basically rectangular shape formed such that the slot nut can be inserted into the T-shaped groove of the profile rail when the longer edge of the rectangular shape is oriented in the lengthwise direction and, by rotation about the longitudinal axis of the clamping pin, can be brought into engagement behind the grooves such that the longer edge extends perpendicularly to the lengthwise direction in order to brace the support element to the rear load carrier.

The design of the clamping device is based on the consideration to provide a clamping device as a separate element from the extension module. Due to the rectangular shape of the slot nut, it can be inserted into the T-shaped groove when the support elements are already positioned on the load carrier. Accordingly, it can be inserted through the narrow upper groove section when the slot nut is oriented such that the small edge extends perpendicularly to the lengthwise direction. Once the slot nut has reached the wide bottom groove section, it can be rotated such that the slot nut engages behind the upper groove section. In this way, the clamping device can be used to brace the support element to the rear load carrier.

Preferably, the clamping lever may be moveable relative to the pivot joint between an insertion position, in which the clamping pin extends at least substantially in the same direction as the clamping lever, and a clamping position, in which the clamping pin extends at least substantially perpendicularly to the direction of the clamping lever. For this purpose, the clamping lever comprises at the end section of the pivot joint a through-slot which divides the clamping lever, so that the elongated clamping pin can rotate freely about the rotation axis of the pivot joint relative to the clamping lever.

In order to clamp a support element to the profile rail, the clamping lever may comprise a clamping surface, which extends parallel to the rotation axis of the pivot joint and is spaced apart from the pivot joint such that the support element and the profile rail of the rear load carrier are pressed together between the slot nut and the clamping surface when the clamping lever is moved from its insertion position into the clamping position and the clamping surface comes into contact with a corresponding holding surface of the extension module to be attached. In other words, the contact surface of the clamping lever is spaced apart from the pivot joint such that the profile rail and the support element are clamped together between the slot nut and the clamping surface of the clamping lever. Accordingly, the distance between the T-shaped groove and the upper side of the support element is chosen such that the elements may be pressed together between the slot nut and the clamping surface of the clamping lever. Guiding projections may be formed in the holding surface in order to avoid an unintentional rotation of the clamping device when the clamping lever is in its clamping position and the clamping surface is in contact with the holding surface. The holding surface and the guiding projections may be formed by a guide plate arranged on the support element in particular fixed thereto, preferably welded or braised thereto.

In order to ensure a stable fixation to the rear load carrier, an adapter element may be assigned to each support element of the extension module, wherein the adapter element comprises a flat upper surface and a lower surface complementary of the contour of the profile rails of the rear load carrier so that the adapter element can be arranged between the support element and the profile rail of the rear load carrier. In this way, a stable contact over a large surface of the adapter element on the profile rail of the rear load carrier on one hand and of the support element on the adapter element on the other hand can be realized. The adapter element may have a through-hole through which the clamping device, in particular the clamping pin, can be inserted and extend, when the support element is braced against the profile rail of a rear load carrier.

Figure 2:
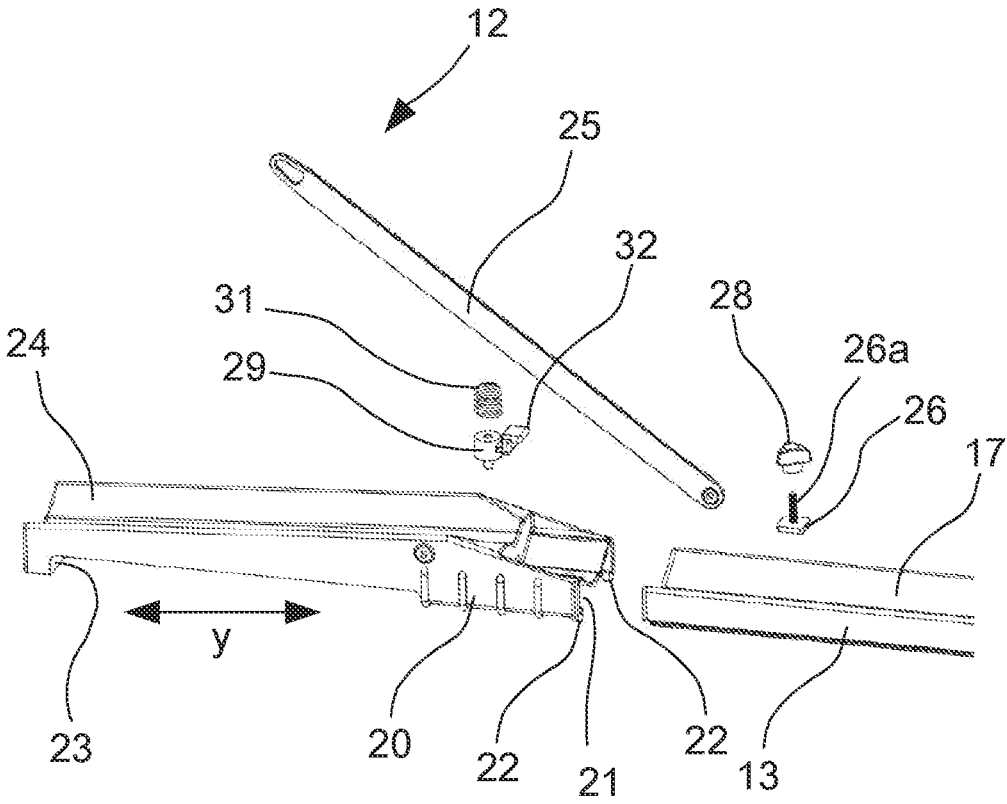
Figure 3:
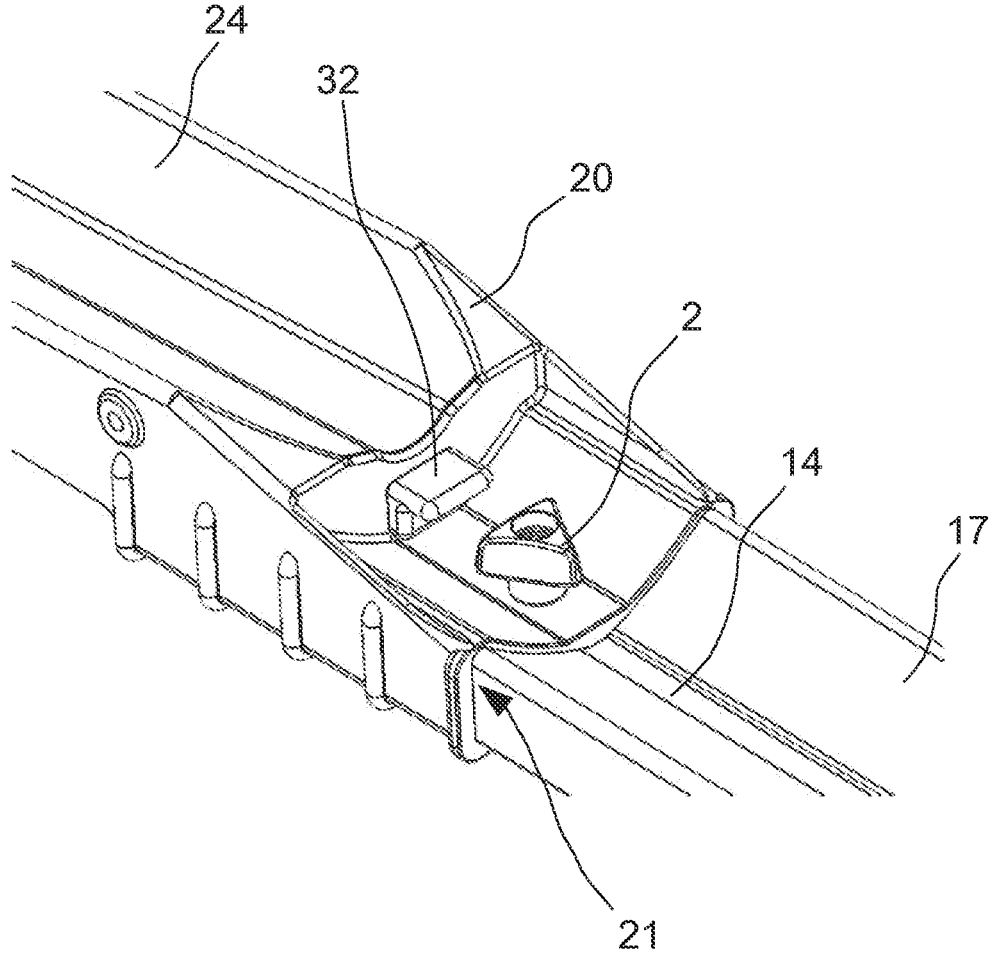
Figures 4, 5:
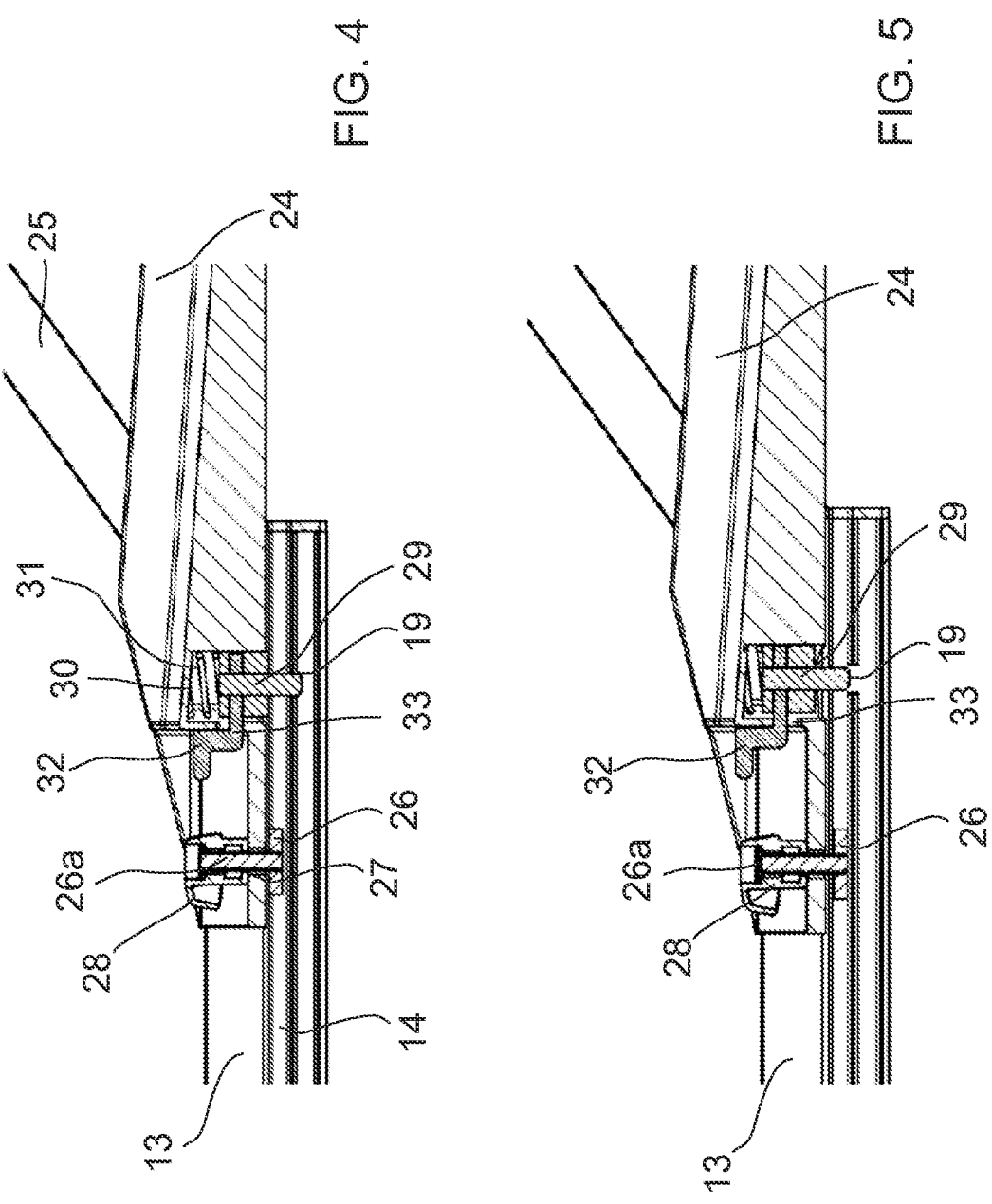
Figure 6:
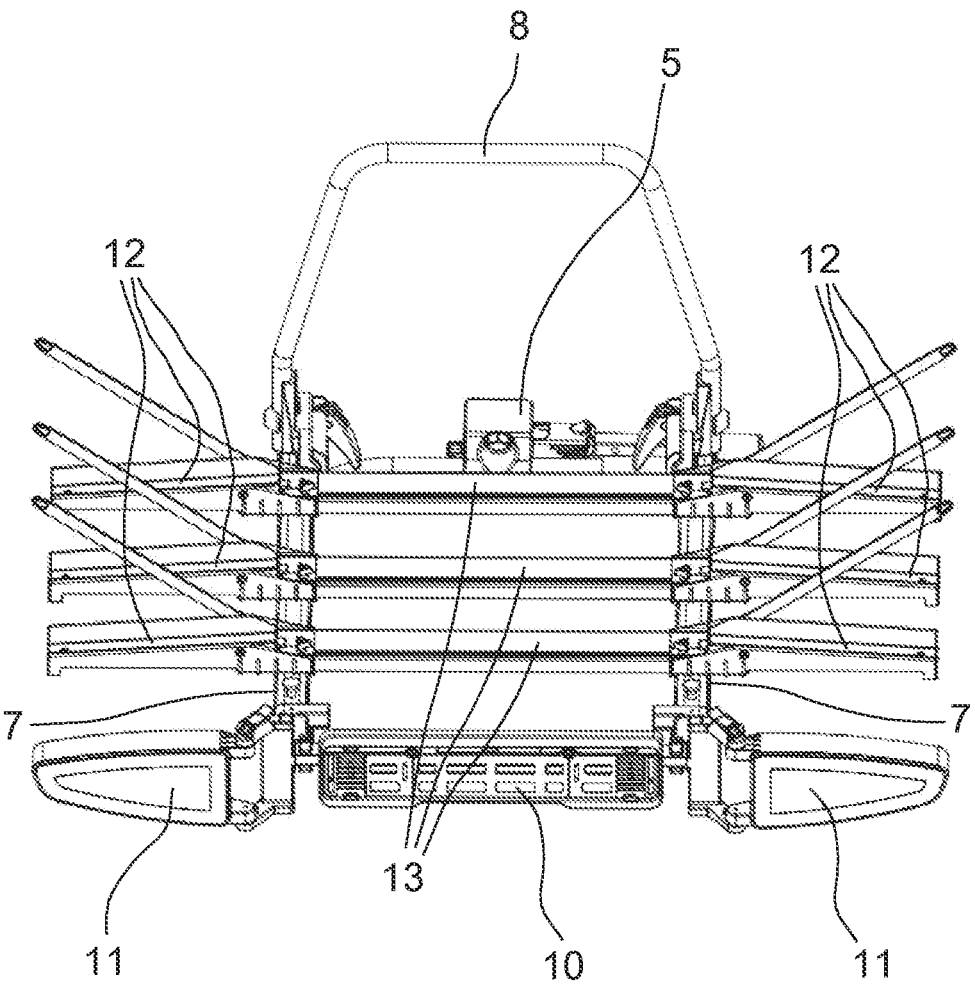
Figure 7:
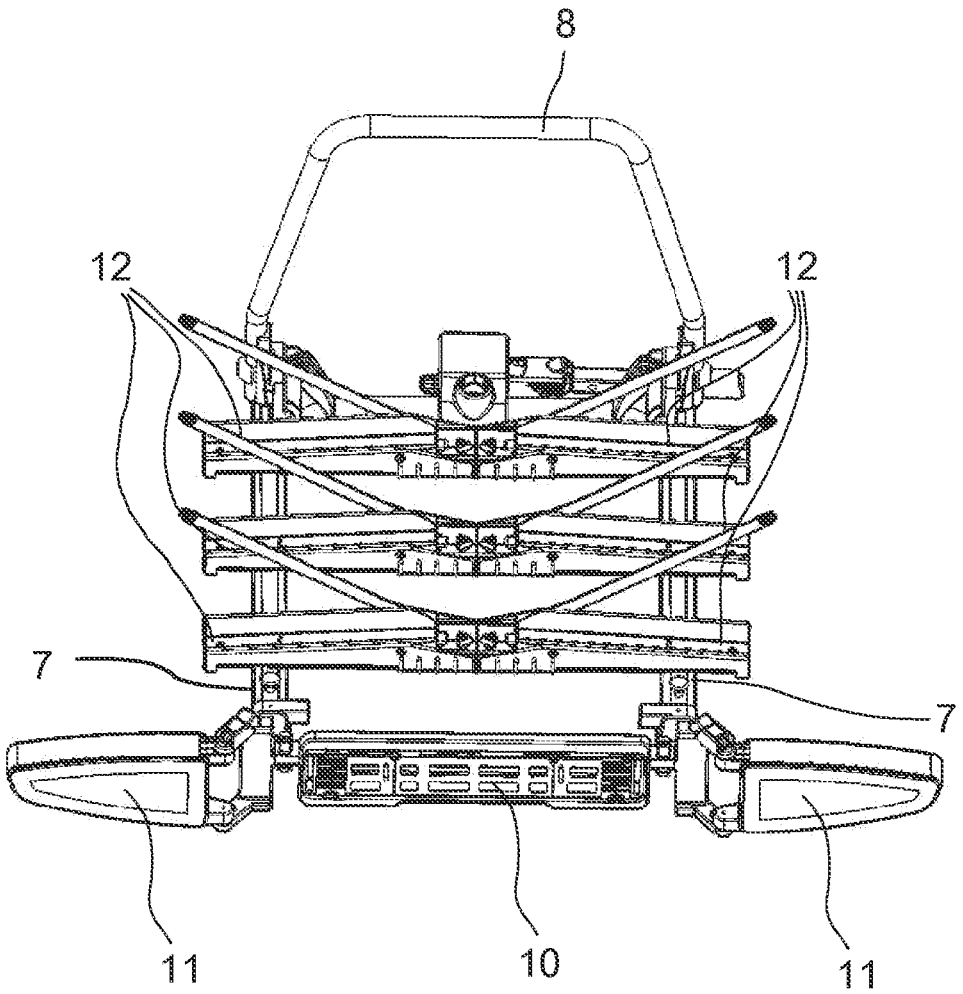
Figure 8:
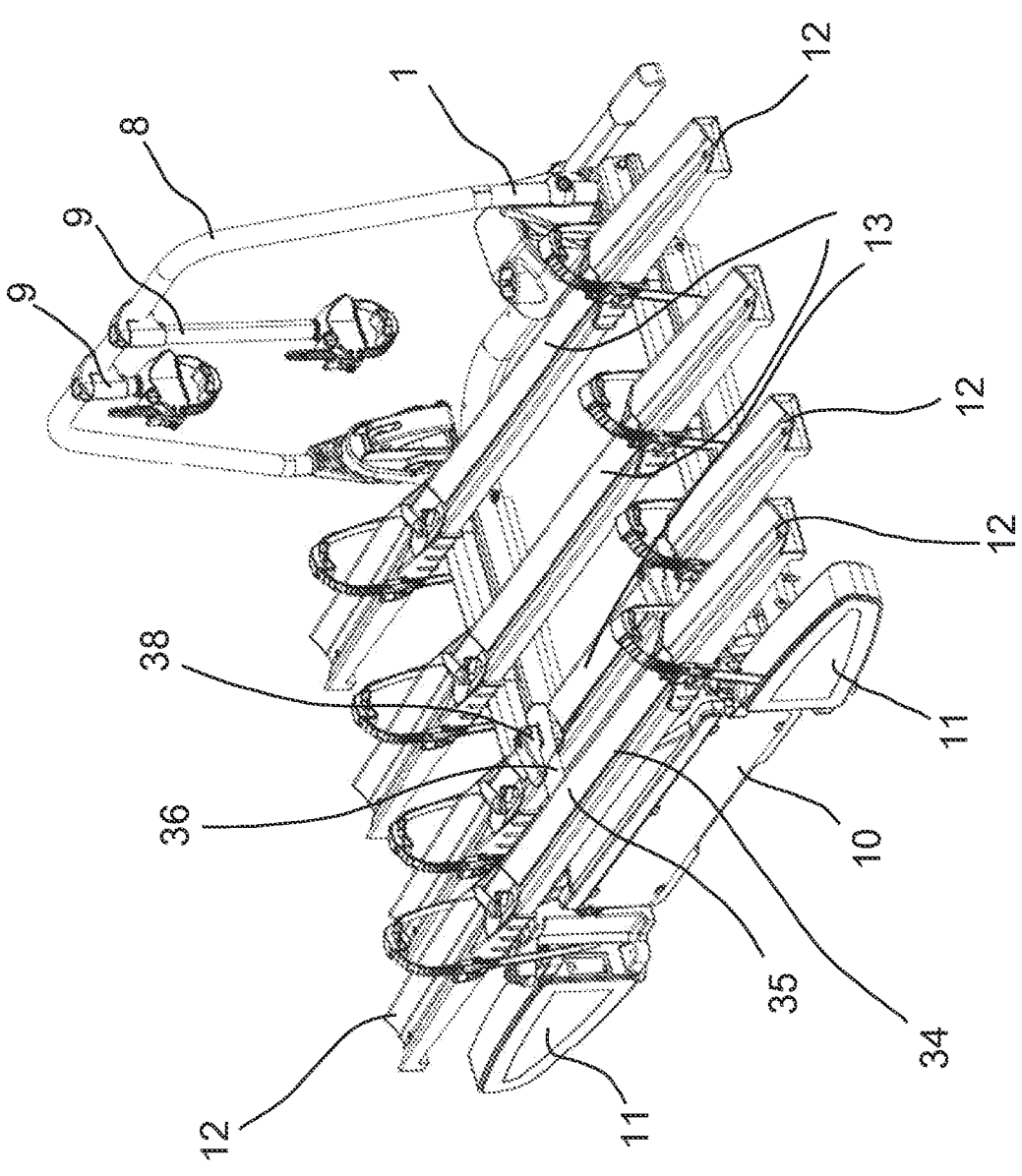
Figure 9:
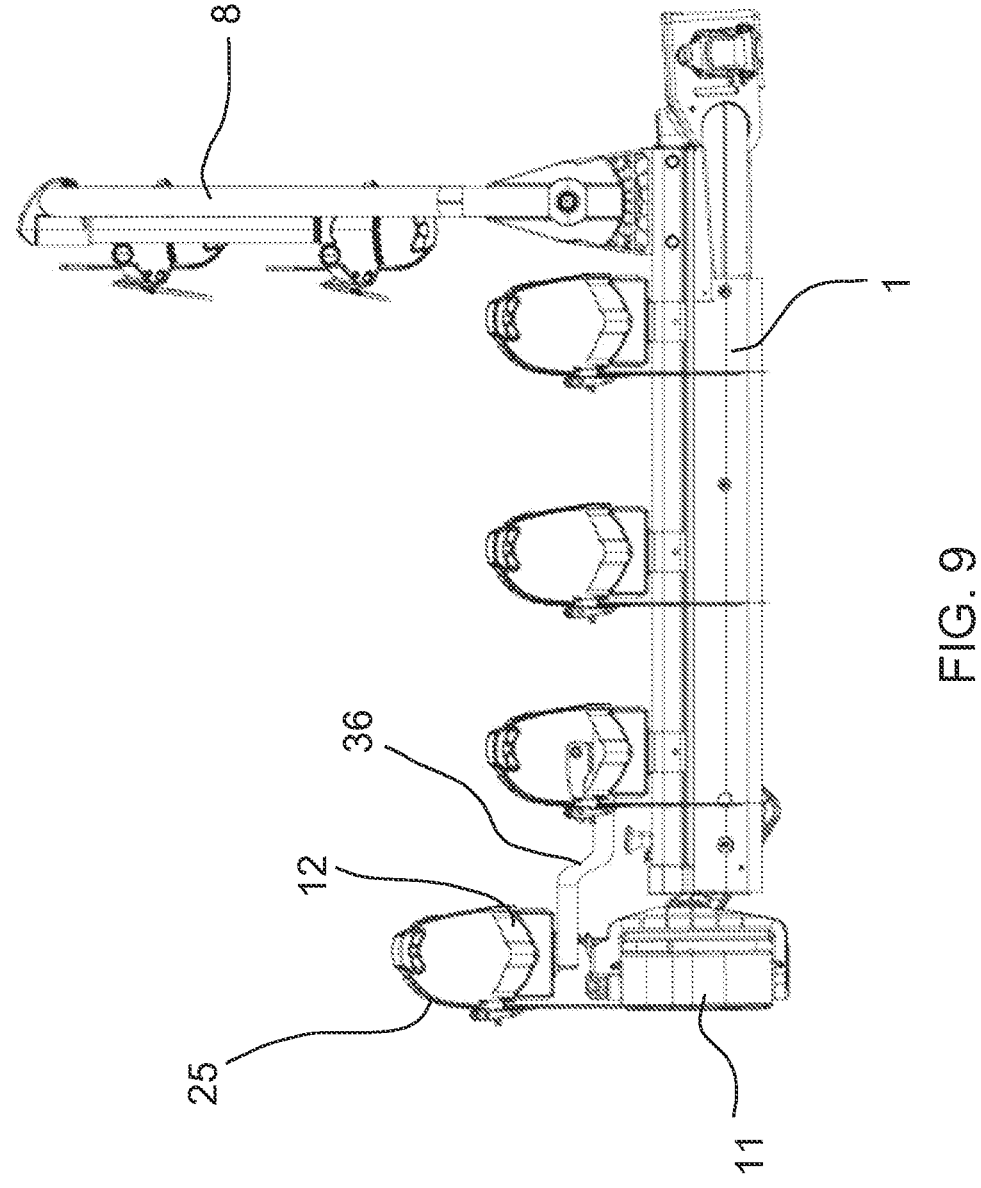
Figure 10:
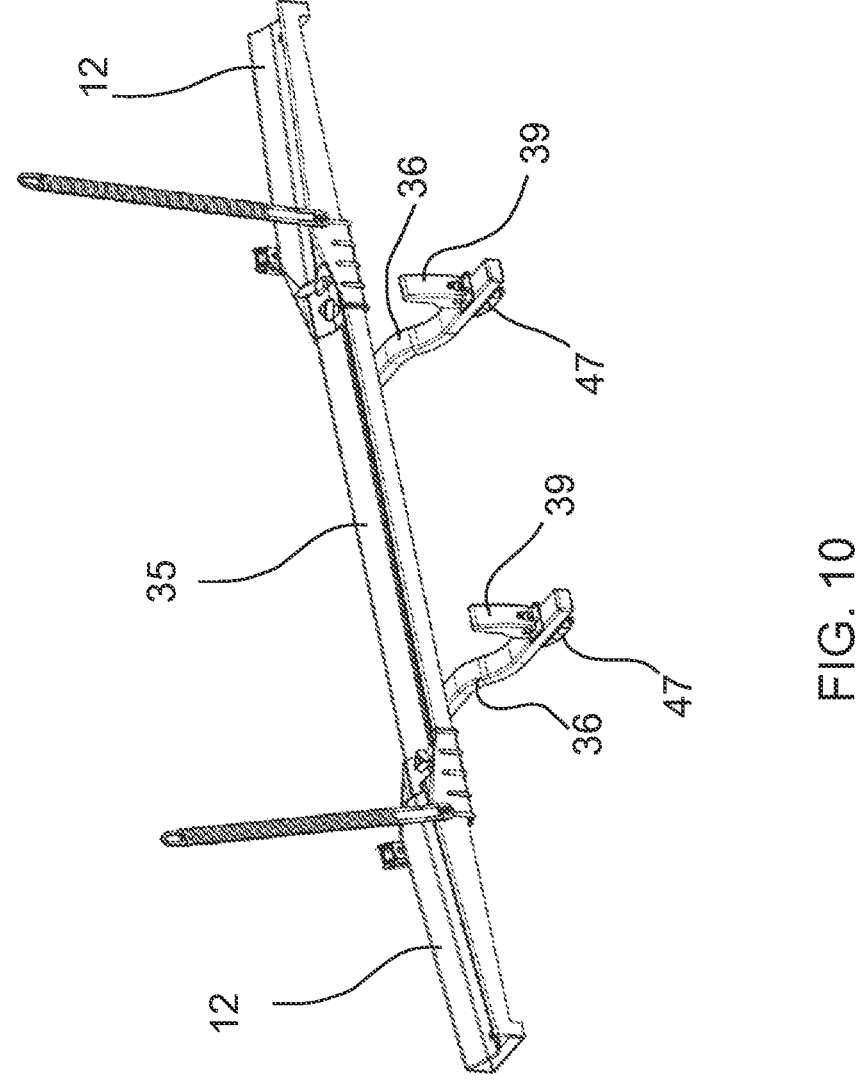
Figure 11:
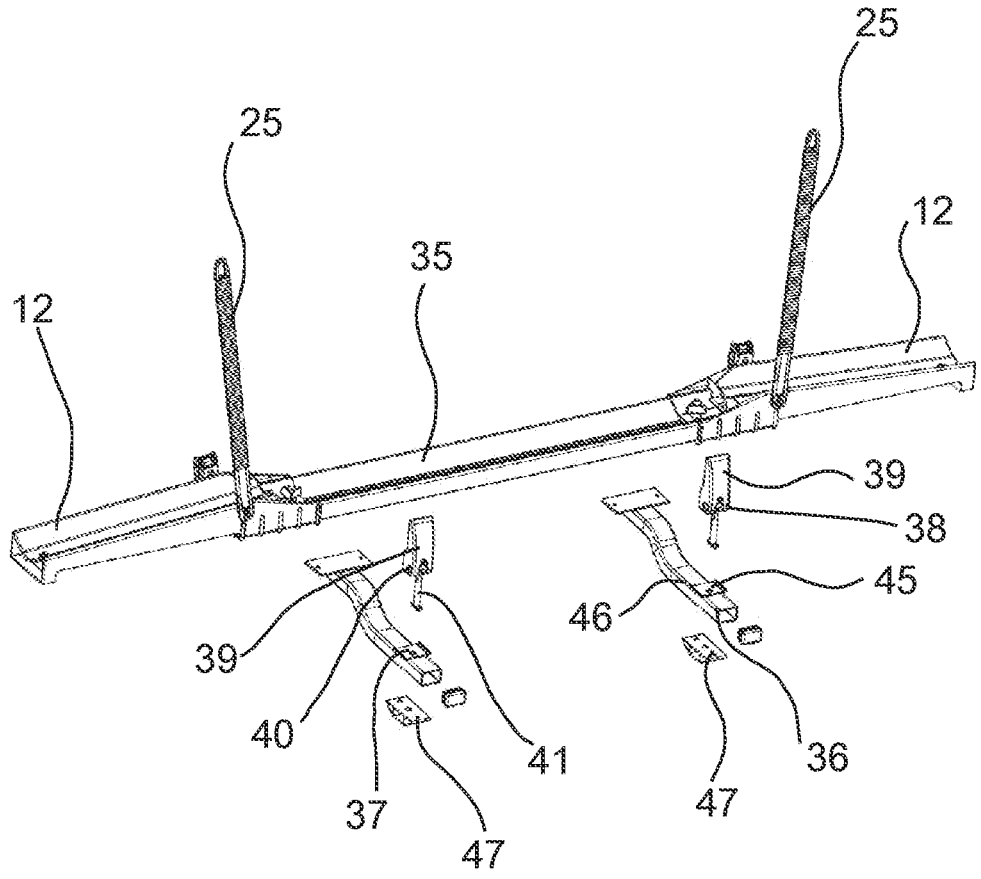
Figure 12:
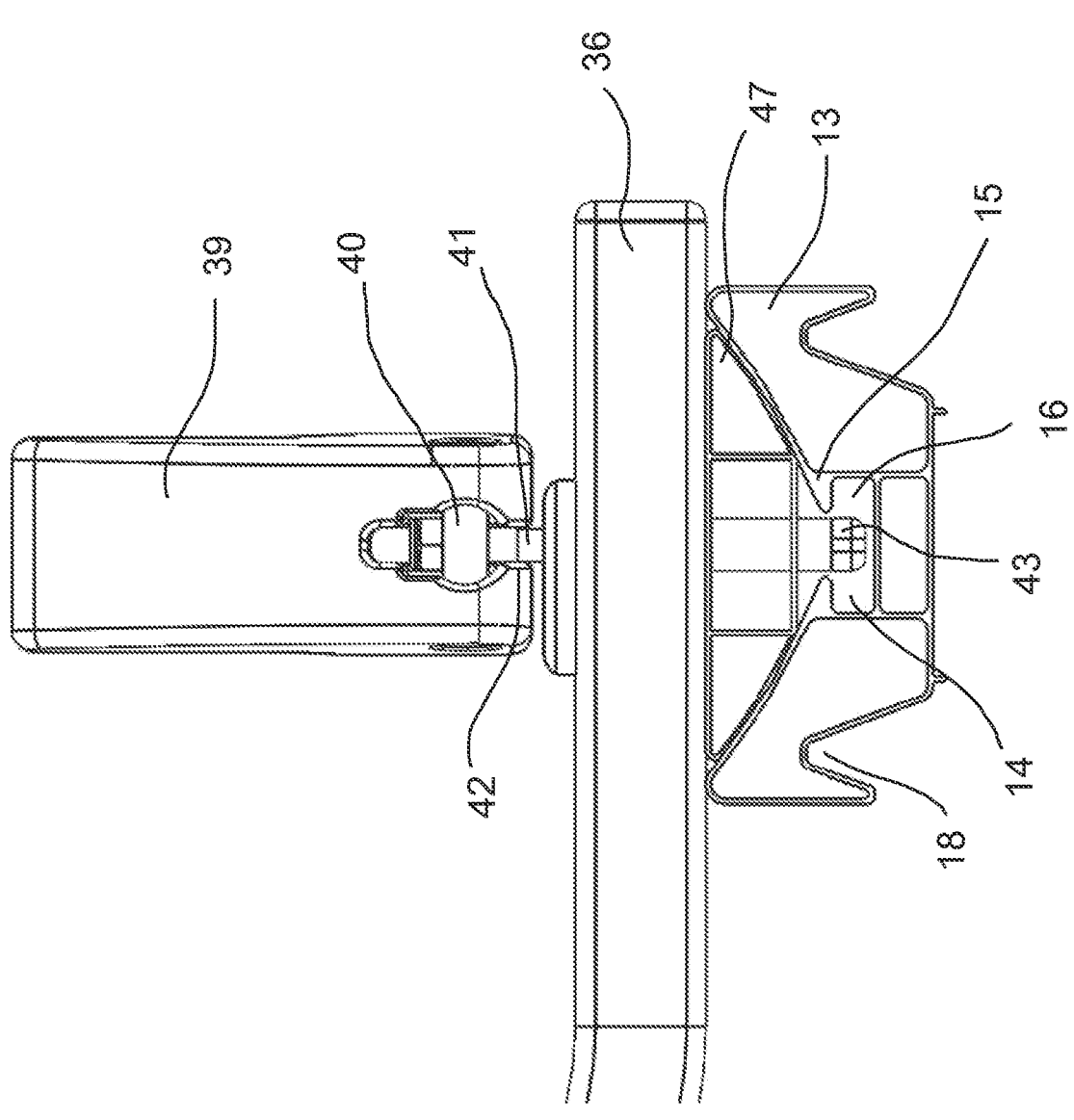
Figure 13:
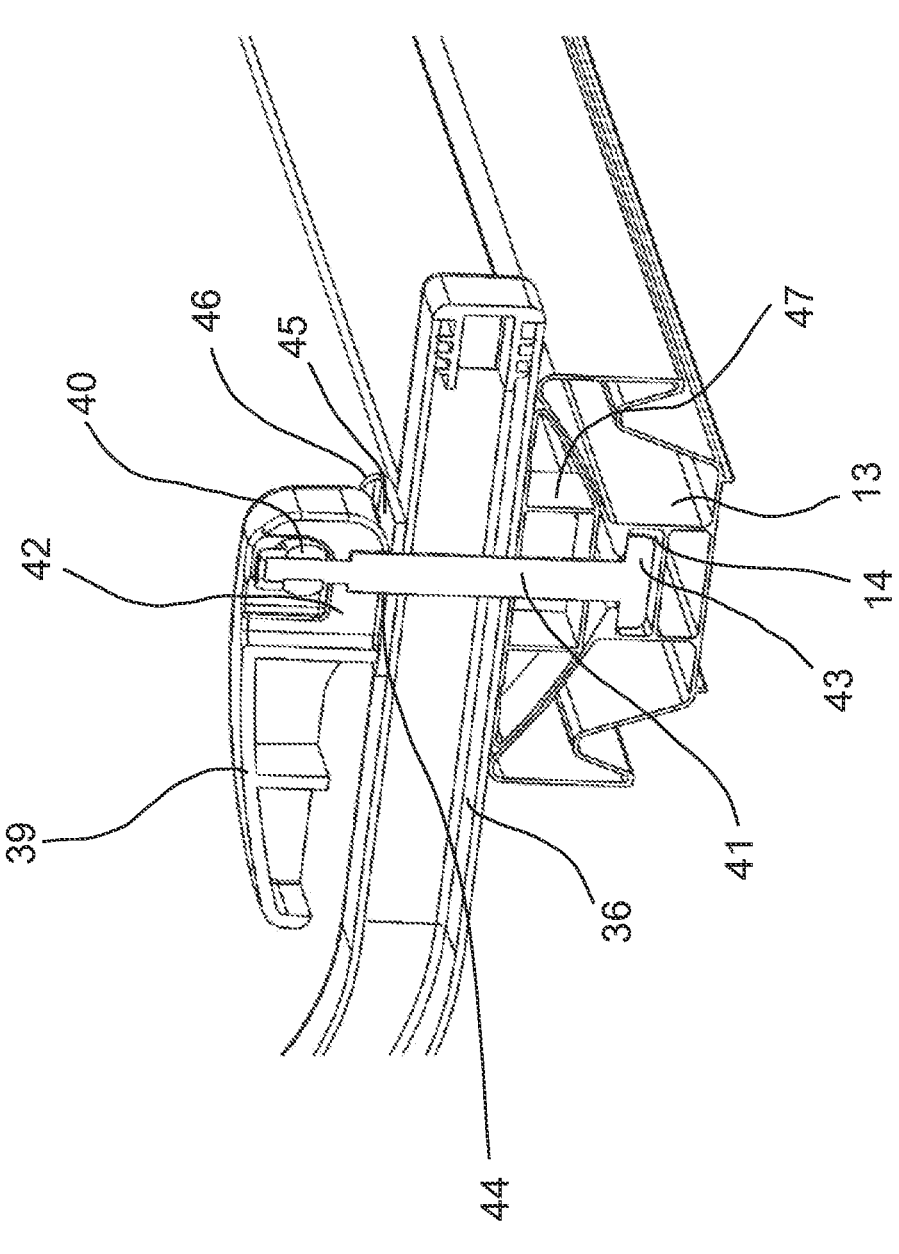

With regard to the embodiment of the invention, reference is also made the subclaims and to the following description of an embodiment with reference to the attached drawings. The drawing shows as follows:

FIG. 1 a rear load carrier according to the invention in a top view;

FIG. 2 a wheel holder for releasable attachment to the rear load carrier of FIG. 1 in an exploded perspective view;

FIG. 3 the wheel holder of FIG. 2 attached to a profile rail of the rear load carrier in a partial perspective view;

FIG. 4 the arrangement of FIG. 3 in a cross-sectional view;

FIG. 5 the wheel holder and a profile rail of the rear load carrier in a cross-sectional view;

FIG. 6 the rear load carrier equipped with six wheel holders in a perspective view;

FIG. 7 the rear load carrier shown in FIG. 6 with the wheel holders in another position in a perspective view;

FIG. 8 the rear load carrier of FIG. 1 equipped with six wheel holders and an attached extension module for transporting an additional bike in a perspective view;

FIG. 9 the rear load carrier shown in FIG. 8 in a side view;

FIG. 10 the extension module of FIGS. 8 and 9 as a separate component in a perspective view;

FIG. 11 the extension module shown in FIG. 10 in an exploded perspective view;

FIG. 12 a detailed side view of the extension module attached to a profile rail of the rear load carrier; and FIG. 13 the arrangement of FIG. 12, wherein the clamping device is in its clamping position, in a cross-sectional perspective view.

FIG. 1 shows a rear load carrier 1 for mounting to a vehicle according to the present invention. The rear load carrier 1 comprises a base body 2, which defines a longitudinal direction L between its front side and its rear side and a transverse direction T. In concrete terms, the base body 2 has the shape of a C open towards the rear side and comprises two base profiles 3 extending in the longitudinal direction L. The base profiles 3 are, at their front end, connected to each other by means of a central section 4 of the base body 2.

At the central section 4, a connecting device 5 for attachment to a vehicle-side trailer coupling is provided. This connecting device 5 comprises an actuating lever 6, which can be pivoted about a pivot axis extending in the longitudinal direction L.

The rear load carrier 1 further comprises two sliding profiles 7, which are in engagement with the base profiles 3 and are slidingly moveable with respect to them in the longitudinal direction L between a retracted font position and an extended rear position.

Furthermore, at the front end of the sliding profiles 7, a yoke 8 is attached in order to support a load to be transported on the rear load carrier 1. The yoke 8 has the shape of a U open towards the bottom and is attached to the sliding profiles 7 such that it can be moved relative to them between an upright position, which is shown in FIG. 1, and an at least substantially horizontal position, in which the yoke 8 lies on the base body 2. The yoke 8, in its upright position, serves to fix for example the frame of a bicycle to be transported by means of a corresponding connection device 9, which is attached to the yoke 8 in FIGS. 8 and 9. At the rear end of the base profiles 3, a license plate holder and two rear light units 11 are attached.

The rear load carrier 1 also comprises fixing means for releasably attaching wheel holders 12. The fixing means comprise three profile rails 13 fixed to the sliding profiles 7 and extending in the transverse direction T. The three profile rails 13 are each spaced apart from an adjacent profile rail 13 at the same distance and the profile rails 13 have an identical cross-section over their entire, identical length. The profile rails 13, as it is visible for example in FIG. 12, are formed as hollow profiles and comprise a groove 14 having a T-shaped cross section extending in the lengthwise direction of the profile rail 13. The T-shaped groove 14 is open towards the upper side and is arranged centrally in the profile rail 13. This means that the T-shaped groove 14 comprises a narrow upper groove section 15 and a wide bottom groove section 16, so that the bottom groove section 16 undercuts the upper groove section 15.

Towards their upper side, the profile rails 13 have a concave outer contour 17, in which the T-shaped groove 14 is arranged centrally. Furthermore, on their both lateral sides, the profile rails 13 comprise an engagement groove 18, which has a V-shaped cross-section open towards the bottom. The cross-section of both engagement grooves 18 on the lateral sides of the profile rails 13 is formed identically.

In order to avoid an unintended loosening of a load receiving device, safety holes 19 are provided in the lengthwise end sections of the profile rails 13. These safety holes 19 extend from the ground of the T-shaped groove 14 into the profile rail 13 and are not formed as through-holes.

In FIGS. 2 to 7, an arrangement is shown, in which in total six wheel holders 12 according to the invention are attached to the profile rails 13 so that the rear load carrier 1 can be used to transport three bicycles. The wheel holders 12 are designed so that they can be pushed on an end section of the profile rail 13 of the rear load carrier 1.

The detailed structure of a wheel holder 12 is shown in FIG. 2. The wheel holder 12 comprises a wheel holder body 20 which defines a lengthwise direction Y. The wheel holder body 20 is an injection moulded plastic part. On the right (proximal) side shown in FIG. 2, the wheel holder body 20 has a receiving opening 21 open to a proximal end which has a cross-section complementary to the cross section of the profile rails 13. Accordingly, the wheel holder body 20 can be pushed with its proximal end on the profile rail 13 and surrounds the profile rail 13 partially. In concrete terms, the receiving opening 21 is open towards the bottom and encompasses the profile rail 13 from the top. The contour of the receiving opening 21 can engage into the engagement grooves 18 of the profile rail 13. For this purpose, engagement projections 22 are formed at both lateral sides of the receiving opening 21. The engagement projections 22 engage inwards and upwards so that they can be brought into engagement into the engagement grooves 18. In this way, the wheel holder 12 is fixed in a form-fit manner perpendicularly to the lengthwise direction of the profile rail 13, but can be moved in the lengthwise direction.

In the left (distal) end section of the wheel holder body 20, an abutment protrusion 23 facing downwardly is formed in the wheel holder body 20. Accordingly, the wheel holder body 20 can be pushed on the profile rail 13 until the end of the profile rail 13 comes into contact with the abutment protrusion 23. This configuration is shown in FIG. 7 and allows a space-saving transport of the rear load carrier 1 with attached wheel holders 12, in particular when the rear load carrier 1 is not in use.

The wheel holder body 20 comprises in an end section (on the left side in FIG. 2) an upwardly open wheel receiving deepening 24, which extends in the lengthwise direction Y, for receiving the wheel of a bicycle.

Furthermore, the wheel holder 12 comprises fastening means in order to fix a wheel of a bicycle. In concrete terms, these fastening means comprise a belt 25 which is, at one end, attached to the wheel holder body 20 and can be laid around the wheel of a bicycle. The other end can be equally fixed to the wheel holder body 20 in order to brace the wheel of a bicycle against the wheel holder body 20. Accordingly, the wheel holders 12 can be positioned on the profile rail 13 relative to each other depending on the distance between the wheels of a bicycle to be transported.

In order to avoid an unintended movement of the wheel holder 12 relative to the profile rail 13, corresponding locking means are provided. For this purpose, the locking means comprise a slot nut 26, which can be positioned in the T-shaped groove 14 of the profile rail 13. The slot nut 26 comprises a threaded pin 26a extending upwards, which threaded pin 26a extends through a through-hole 27 formed in the wheel holder body 20 so that the free end of the threaded pin 26a protrudes upwards from the wheel holder body 20. A corresponding clamping nut 28 is provided which can be screwed on the free end of the threaded pin 26a, so that the profile rail 13 and the wheel holder body 20 can be braced to each other between the slot nut 26 and the clamping nut 28. The clamping nut 28 is provided with recesses in its outer contour so that it can be actuated by hand.

Furthermore, safety means are provided in order to avoid an unintentional separation of the wheel holder 12 from the corresponding profile rail 13. In concrete terms, the safety means comprise a safety pin 29, which is moveably held in a corresponding receiving hole 30 formed in the wheel holder body 20 and open towards the bottom. The safety pin 29 can be moved between an upper position, in which the safety pin 29 is out of contact with a corresponding profile rail (shown in FIG. 5), and a lower position, in which the safety pin 29 can engage into the safety hole 19 as shown in FIG. 4.

It is intended, that the safety pin 29 comes automatically into engagement with the safety hole 19, when the wheel holder 12 moves unintentionally and it is likely that the wheel holder body 20 separates from the profile rail 13. For this purpose, the safety pin 29 is biased towards the lower position by means of a corresponding helical compression spring 31, which support against the upper end of the receiving hole 30.

In order to bring the safety pin 29 out of engagement from the safety hole 19 against the restoring force of the helical compression spring 31, a manual lever 32 is fixed to the safety pin 29 and extends through a lever opening 33 formed in the receiving hole 30. The lever opening 33 is dimensioned such that the manual lever 32 reaches the upper end (shown in FIG. 5), when the safety pin is out of contact with the profile rail 13, and reaches the lower end of the lever opening 33, when the safety pin 29 is in engagement in the safety hole 19. The safety means ensure that the wheel holder 12 cannot be separated from the profile rail 13 even if the clamping nut 28 and the slot nut 26 loosen so that the force-fit connection fails.

FIGS. 8 to 13 show an extension module 34 for carrying an additional bicycle, which is or can be releasably attached to the rear load carrier 1.

The extension module 34 comprises an extension profile rail 35 and two wheel holders 12. They are pushed on the free ends of the extension profile rail 35. The extension profile rail 35 is designed identically to the profile rails 13. Accordingly, the mechanism of attaching the wheel holders 12 to the extension profile rail 35 is identical to the one described above regarding the wheel holders 12 and the profile rails 13.

Furthermore, the extension module 34 comprises two support elements 36 extending parallel to each other. The support elements 36 are made of a bent hollow profile. One end of each support element 36 is connected to the extension profile rail 35, in concrete terms screwed thereto. The other end comprises attachment means in order to attach the extension module 34 releasably to the rear load carrier 1. For this purpose, one through-opening 37 is provided in the free end section of each support element 36 and a clamping device 38 is assigned to each support element 37.

The clamping device 38 is visible on FIGS. 12 and 13 in detail. It comprises a clamping lever 39 and a pivot joint 40, which is rotatably held at an end section of the clamping lever 39. Furthermore, the clamping device 38 comprises an elongated clamping pin 41, which is fixed to the pivot joint 40 and extends perpendicularly to the rotation axis of the pivot joint 40. In order to allow a movement of the elongated clamping pin 41, the clamping lever 39 comprises at the end section of the pivot joint 40 a through-slot 42, which divides the clamping lever 39 so that the elongated clamping pin 41 can rotate freely about the rotation axis of the pivot joint 40 relative to the clamping lever 39.

At the free end of the clamping pin 41, a slot nut 43 is fixed in a rotationally fixed manner. In order to brace the support elements 36 to the rear profile rail 13, the clamping pin 41 can be inserted into the through-opening 37 such that the slot nut 43 reaches the T-shaped groove 14 formed in profile rail 13.

The slot nut 43 has a basically rectangular shape. The rectangular shape is formed such that the slot nut 43 can be inserted into the T-shaped groove 14 when the longer edge of the rectangular shape is oriented in the lengthwise direction of the T-shaped groove 14. By rotation about the longitudinal axis of the clamping pin 41, a slot nut 43 can be brought into engagement behind the groove 14, such that the longer edge extends perpendicularly to the lengthwise direction of the profile rail 13.

In order to brace the support element 36 against the profile rail 13, the clamping lever 39 is movable relative to the clamping pin 41 between an insertion position, in which the clamping pin 41 extends at least substantially in the same direction as the clamping lever 39, and a clamping position, in which the clamping pin 41 extends substantially perpendicularly to the direction of the clamping lever 39. As it is visible in FIG. 13, the slot nut 43 is arranged relative to the clamping lever 39 such that, when the slot nut 43 engages behind the T-shaped groove 14 of the profile rail 13, the clamping lever 39 extends perpendicularly to the lengthwise direction of the profile rail 13.

The clamping lever 39 comprises a clamping surface 44 which extends parallel to the rotation axis of the pivot joint 40 and is spaced apart from the pivot joint such that the support element 36 and the profile rail 13 are pressed together between the slot nut 43 and the clamping surface 44, when the clamping lever 39 is in its clamping position and the clamping surface 44 is in contact with a corresponding holding surface 45 of the support element 36, as it is shown in FIG. 13. The clamping lever 39 may be guided by elongated guiding projections 46 protruding upwards from the holding surface 45 in order to avoid an unintentional rotation of the clamping device 38 about the longitudinal axis of the elongated clamping pin 41. In this way, it is avoided that the slot nut 43 comes out of engagement from the T-shaped groove 14 unintentionally.

The attachment means further comprise an adapter element 47, which is arranged between the support element 36 and the profile rail 13. It comprises a flat upper surface and a lower surface complementary to the concave contour 17 of the profile rails 13. In this way, a stable fixation of the support element 36 on the profile rail 13 can be achieved. A through-hole is provided in the adapter element 47, through which the clamping pin 41 of the clamping device 38 can extend. In this way, the adapter element 36 can also be fixed between the support element 36 and the profile rail 13, when the support element 36 is braced against the profile rail 13.

REFERENCE CHARACTER LIST

1 Rear load carrier
2 Base body
3 Base profile
4 Central section
5 Connecting device
6 Actuating lever
7 Sliding profile
8 Yoke
9 Connection device
10 License plate holder
11 Rear light unit
12 Wheel holder
13 Profile rail
14 T-shaped groove
15 Upper groove section
16 Bottom groove section
17 Concave outer contour
18 Engagement groove
19 Safety hole
20 Wheel holder body
21 Receiving opening
22 Engagement projection
23 Abutment protrusion
24 Wheel receiving deepening
25 Belt
26 Slot nut
26a Threaded pin
27 Through-hole
28 Clamping nut
29 Safety pin
30 Receiving hole
31 Helical compression spring
32 Manual lever
33 Lever opening
34 Extension module
35 Extension profile rail
36 Support element
37 Through-opening
38 Clamping device
39 Clamping lever
40 Pivot joint
41 Clamping pin
42 Through-slot
43 Slot nut
44 Clamping surface
45 Holding surface
46 Guiding projection
47 Adapter element
L Longitudinal direction
T Transverse direction
Y Lengthwise direction

The invention claimed is:

1. Wheel holder for releasable attachment to a rear load carrier for mounting to a vehicle comprising at least one profile rail, wherein the wheel holder is designed such that it can be pushed on an end section of a profile rail of the rear load carrier, wherein the wheel holder comprises a wheel holder body defining a lengthwise direction, which wheel holder body has a receiving opening open to a proximal end, wherein the receiving opening has a cross-section complementary to the cross-section of the profile rail of the rear load carrier so that the wheel holder body can be pushed on the profile rail and can surround the profile rail of the rear load carrier at least partially such that the wheel holder can be fixed in a form-fit manner perpendicularly to the lengthwise direction, wherein engagement projections are formed at both lateral sides of the receiving opening, which engagement projections engage inwards and upwards so that they can be brought into engagement into corresponding engagement grooves formed in the profile rail of the rear load carrier open downwardly.

2. Extension module for carrying a load, having attachment means for releasable attachment to a rear load carrier for mounting to a vehicle, wherein the extension module comprises one extension profile rail and two wheel holders, which wheel holders are pushed on the free ends of the extension profile rail, wherein each wheel holder comprises a wheel holder body defining a lengthwise direction, which wheel holder body has a receiving opening open to a proximal end, wherein the receiving opening has a cross-section complementary to the cross-section of the extension profile rail of the extension module, so that the wheel holder body is pushed on the extension profile rail at least partially such that the wheel holder is fixed in a form-fit manner perpendicularly to the lengthwise direction of the extension profile rail, wherein engagement projections are formed at both lateral sides of the receiving opening, which engagement projections engage inwards and upwards so that they are brought into engagement into corresponding engagement grooves formed in the extension profile rail open downwardly.

3. Rear load carrier for mounting to a vehicle, with a base body, which defines a longitudinal direction between its front side and its rear side and a transverse direction, a connecting device for attachment to a vehicle-side trailer coupling provided at the front side of the base body, and fixing means, which comprise at least two profile rails which are held on the base body and extend in the transverse direction, wherein at least one end of at least one profile rail, a wheel holder is pushed on, wherein the wheel holder comprises a wheel holder body defining a lengthwise direction, which wheel holder body has a receiving opening open to a proximal end, wherein the receiving opening has a cross-section complementary to the cross-section of the profile rail of the rear load carrier so that the wheel holder body is pushed on the profile rail and surrounds the profile rail of the rear load carrier at least partially such that the wheel holder is fixed in a form-fit manner perpendicularly to the lengthwise direction, wherein engagement projections are formed at both lateral sides of the receiving opening, which engagement projections engage inwards and upwards so that they are in engagement into corresponding engagement grooves formed in the profile rail of the rear load carrier open downwardly.

* * * * *